United States Patent [19]

Gruich et al.

[11] Patent Number: 4,554,989

[45] Date of Patent: Nov. 26, 1985

[54] MULTIMOTOR MODULAR ELECTRIC DRIVE POWERTRAIN SYSTEM FOR TURBINE POWERED VEHICLES

[76] Inventors: Peter Gruich, 31432 Schoenherr, Apt. #5, Warren, Mich. 48093; J. Lawrence Stopke, 4121 Buckingham St., Royal Oak, Mich. 48073

[21] Appl. No.: 459,439

[22] Filed: Jan. 20, 1983

[51] Int. Cl.⁴ ............................................. B60L 11/08
[52] U.S. Cl. .................................. 180/65.4; 180/6.5; 180/65.6; 244/60
[58] Field of Search ...................... 180/6.5, 65.1, 65.3, 180/65.4, 65.5, 65.6; 244/58, 60

[56] References Cited

U.S. PATENT DOCUMENTS

| | | | |
|---|---|---|---|
| 1,172,456 | 2/1916 | Hoadley | 180/65.5 |
| 1,743,751 | 1/1930 | Baker | 180/65.5 |
| 2,368,630 | 2/1945 | Bizjak | 244/58 |
| 2,462,201 | 2/1949 | Kilgore et al. | 244/60 |
| 2,581,596 | 1/1952 | Nims | 180/65.4 |
| 3,267,311 | 8/1966 | Lamparty | 180/65.6 |
| 3,297,926 | 1/1967 | Campbell et al. | 180/65.5 |
| 4,354,144 | 10/1982 | McCarthy | 180/65.4 |

FOREIGN PATENT DOCUMENTS

| | | | |
|---|---|---|---|
| 825962 | 3/1938 | France | 180/6.5 |
| 113973 | 10/1918 | United Kingdom | 180/6.5 |

*Primary Examiner*—Joseph F. Peters, Jr.
*Assistant Examiner*—Kenneth R. Rice
*Attorney, Agent, or Firm*—Peter A. Taucher; Gail S. Soderling; Robert P. Gibson

[57] ABSTRACT

Turbine powered, self-propelled vehicles utilizing multiple electric motors in sets to comprise part of a novel modular electric powertrain drive system. This novel powertrain system is particularly applicable to larger weight class tracked military vehicles, such as an M-1 tank. However, other large or smaller weight class turbine powered vehicles, are candidates including both track and wheel driven types, as well as certain airborne type vehicles such as helicopters and ground-effect vehicles. The modular powertrain drive system hereof basically comprises a plurality of electric high speed drive motors and also of electrical power generator devices, such as alternators, arranged to be commonly driven by the turbine's effective output shaft. The generator devices will supply the requisite power to the plurality of high speed, heavy duty, electric drive motors circumferentially arranged, each with a drive pinion gear to operatively engage the periphery of a sun gear or ring gear fixed on an output drive shaft disposed concentrically to sets of the circumferentially arranged drive motors and their pinion gears. Preferably there are two sets of the multiple drive motors which together with their output drive shafts collectively act as final output drives for the various type vehicles. The unique concept embodies said plural motors which have relatively low torque, so that their collective high speed input is converted to relatively low speed but high torque output. Torque-speed changes are accomplished through power controller devices by which the operator can vary the electrical energy delivered collectively by the generator devices to the collective sets of drive motors.

4 Claims, 7 Drawing Figures

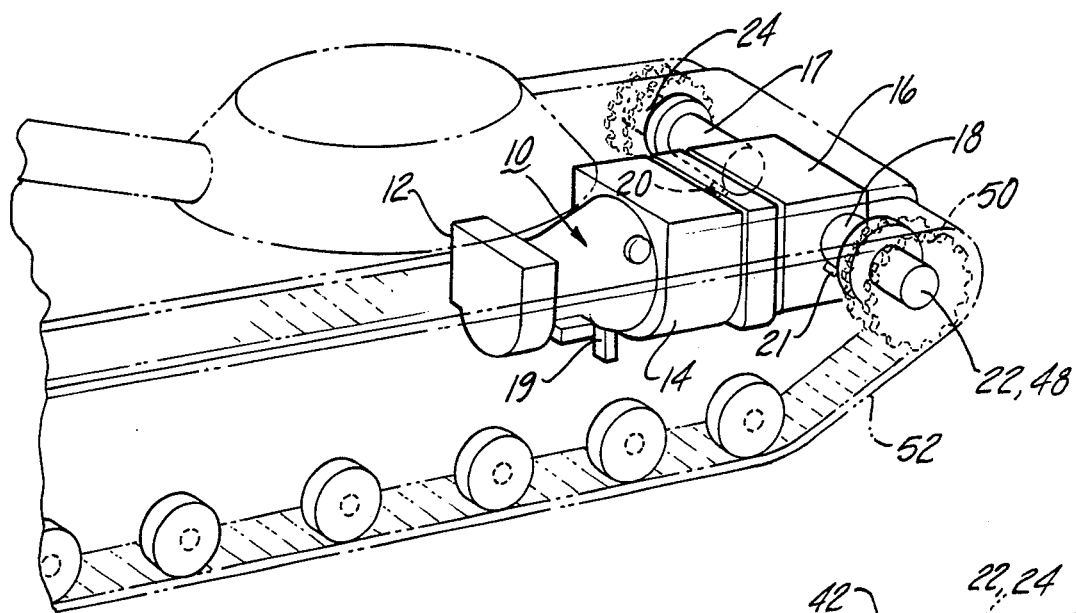
Fig-1
PRIOR ART
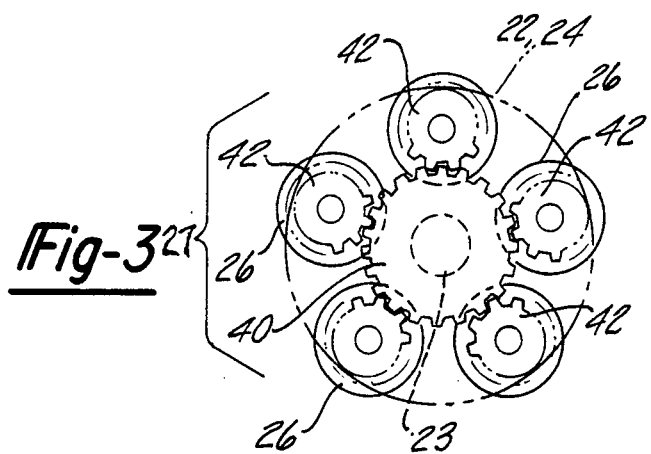
Fig-3
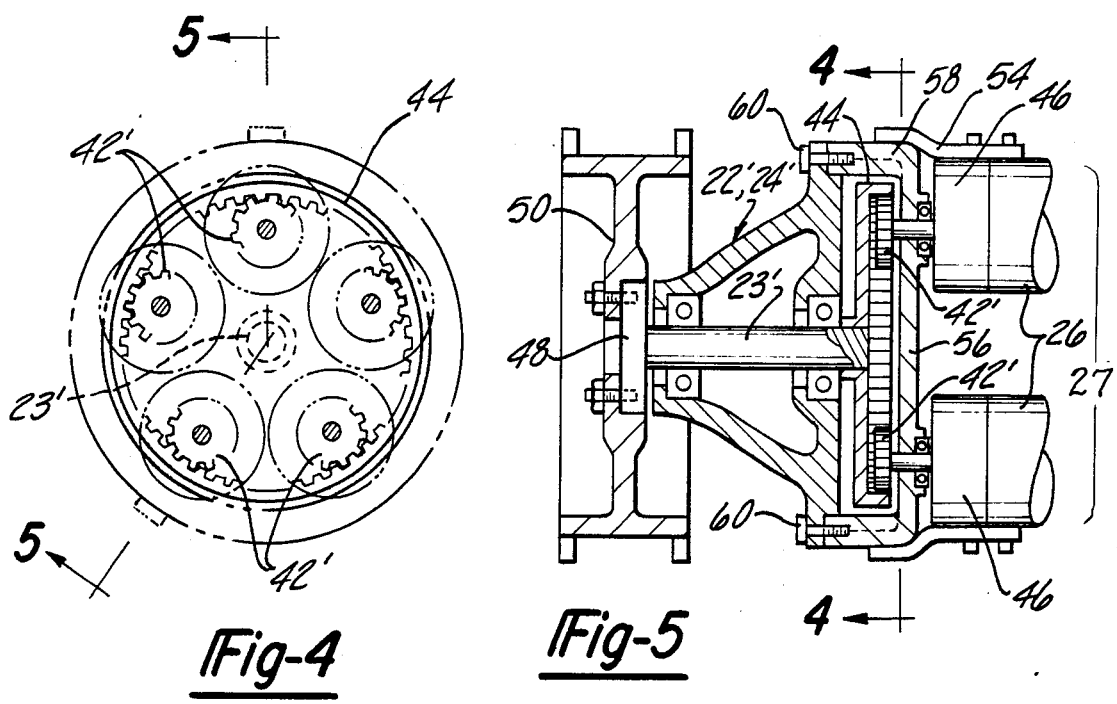
Fig-4
Fig-5

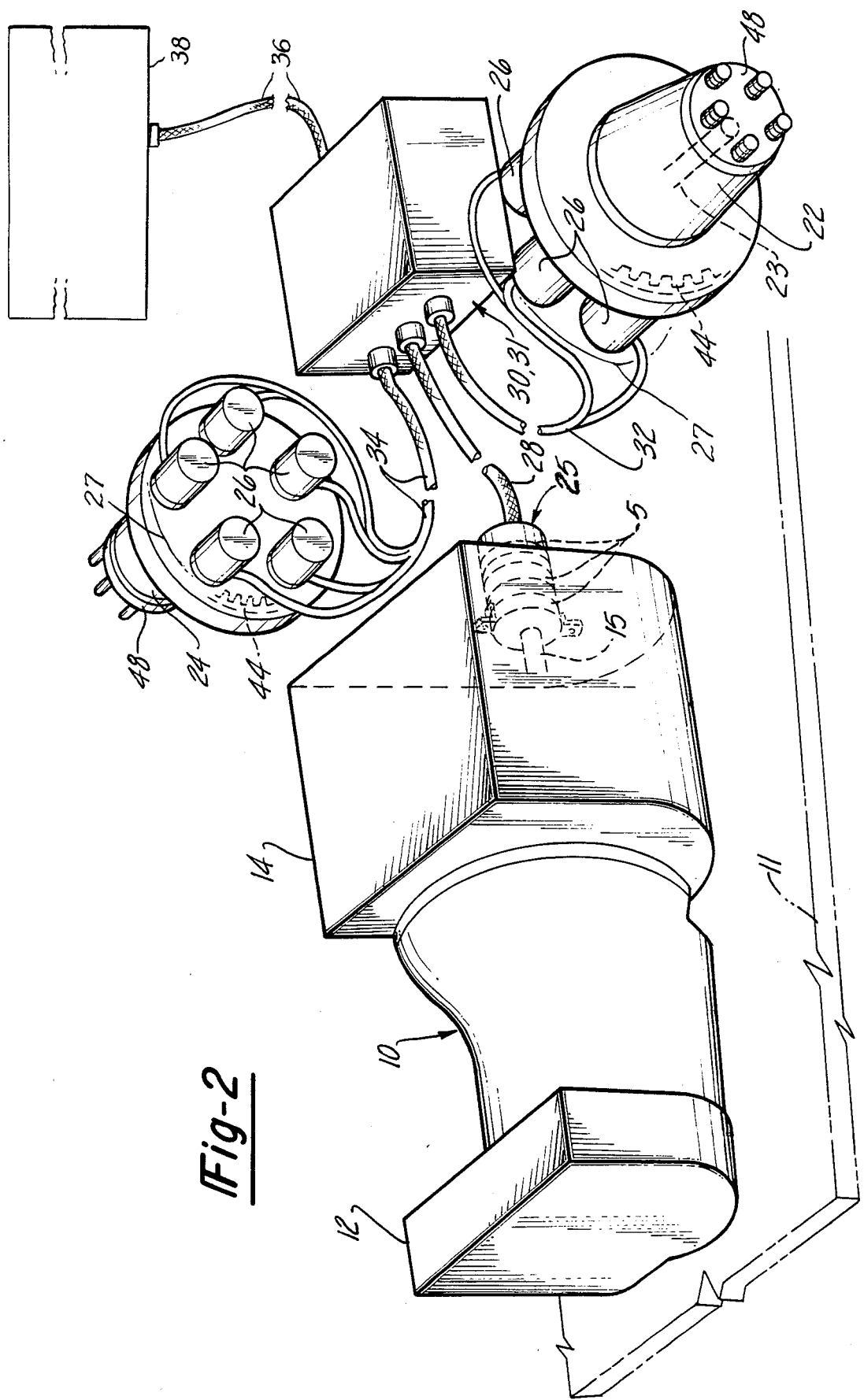

MULTIMOTOR MODULAR ELECTRIC DRIVE POWERTRAIN SYSTEM FOR TURBINE POWERED VEHICLES

GOVERNMENT INTEREST

The invention described herein may be manufactured, used, and licensed by or for the Government for governmental purposes without payment to us of any royalty thereon.

BACKGROUND OF THE INVENTION

This invention relates generally to turbine powered vehicles, and more particularly to electrically driven powertrains for use and in combination with heavy duty, turbine powered vehicles. More specifically, it further relates to a uniquely novel multi-motor electric drive powertrain system adaptable for integratablemodular subcomponent usage in heavy duty, high rpm (15,000–55,000 rpm) turbine powered vehicles as more frequently used by the military service. Exemplary military vehicles may include the heavy weight tracked variety, such as the M-1 and other fighting tank-type vehicles, some of which are powered by the AVCO Lycoming engine ACT 1500 (H.P.). Other similar military vehicles may include tracked personnel/ammunition carriers, as well as somewhat lighter weight tracked or wheeled fighting or tactical vehicles. Additional contemplated uses of this novel powertrain system are with some varieties of turbine powered ground-effect vehicles and turbine powered airborne vehicles, such as helicopters.

Some previous experimentation with electric motor drive systems for military vehicles had been undertaken in the early 1970's, including some by FMC Corporation's Ordnance Division, with plants in San Jose, California and Charleston, W. Virginia.

During that time it was reportedly recognized that with the then recent advent of the silicon-controlled rectifier and other solid state circuitry components, some previously prohibitive problem factors concerning undue weight, size and efficiency of components were believed to be solvable.

Thus, while some forms of electric motor-powered vehicles per se are well known, none of the prior art forms of which we are aware have been engineered according to the present multimotor concept. This concept novelly uses multiple sets of electric drive motors powered by plural alternator/generator means commonly driven by the vehicle's turbine power plant source. Turbine engines of the type contemplated herewith would more likely operate in the 15,000–55,000 rpm range.

BRIEF SUMMARY AND OBJECTS OF THE INVENTION

The present invention contemplates use of known types of turbine engines, such as the aforesaid AVCO Lycoming AGT-1500, which will be used to uniquely drive high capacity electrical power generator means, the latter in turn thus supplying the requisite electrical energy to power the preferably multiple sets of plural high speed electric drive motors. The preferably circumferentially spaced motors of each set will collectively act to propel the vehicle. Some of the arrangements contemplate use of suitable gear reducer units in conjunction with the drive motors which then will have small size pinion gears peripherally meshing with a larger diameter, centrally disposed sun gear or ring gear affixed to each output drive shaft, said shaft to be disposed in centered relation to the circumferentially arranged drive motors. These output drive shafts constitute part of the vehicle's final drive shafts. For certain uses, one or more such shafts will be appropriately connected with suitable drive sprockets mounted thereon, especially in the case of driving tracked or wheeled land vehicles, whereas in the case of aircraft or ground effect vehicles it would be similarly appropriately drivingly connected essentially with one or more primary lift and/or propelling rotors or fans. Some helicopter types would require a similar drive shaft functionally connected also with a secondary combination stabilizing and steering rotor blade.

A principal objective and advantage of this novel proposed system is that the turbine engine can be run at a selected relatively constant speed, preferably the particular design speed of the particular engine. In the case of the AVCO Lycoming AGT 1500 (H.P.), such a speed may be approximately 15,000 rpm, with the torque speed changes to be accomplished by varying the electrical energy delivered by the generator means to the various sets of multiple drive motors. It is further contemplated that the sets of electric motors collectively may be energized and deenergized to adjust the power output, or said motors may be operated continuously at different selected electrical energization levels to adjust the power output. Variations in the arrangement contemplate use of either D.C. or A.C. power systems, with operation of the motors in both forward and reverse directions.

The more preferred A.C. power system has been made possible by the advent of and contemplated use herewith of solid state controls which may embody silicon-controlled rectifiers (SCR Controls). Such SCR units function analogous to a control diode. Components are to be selected so that the total space requirements for the required numbers of electric drive motors etc. will be much less than the space now required for the large existing G-M Diesel-Allison transmission presently used in the M-1 military tank vehicles.

Another principal objective and advantage would be the elimination of the heavy transmission unit with associated inherent large stressful drive forces and the attendant reactive forces on the turbine engine's present generally 3-point suspension system.

These and other objectives and advantages involving maximizing power output in minimum space to contribute to reduction of vehicle silhouette, and thus increasing the vehicle's potential fighting capabilities, will readily become more apparent from the following more detailed description, taken in conjunction with the exemplary drawing figures.

BRIEF DESCRIPTION OF THE DRAWINGS

FIG. 1 is a perspective view depicting one exemplary prior art general arrangement of a present form of propulsion system for an M-1 military tank.

FIG. 2 is a similar perspective semi-diagrammatic view showing this novel invention's comparable electrical drive propulsion system;

FIG. 3 is a diagrammatic elevational view representative of one arrangement for transmitting power from the plural individual motors to an associated drive gear on the output drive shaft;

FIG. 4 is a view similar to FIG. 3; however it shows a modified arrangement for the cooperation of the individual motors with a different form of associated drive gear on the output shaft, as might be seen on view line 4—4 of FIG. 5;

FIG. 5 depicts a vertical, cross-sectional detail view through an exemplary output drive shaft and housing subassembly with two associated drive motors shown in elevation therewith, the latter being viewed substantially on line 5—5 of FIG. 4;

BRIEF DESCRIPTION OF PRIOR ART FIG. 1

Figure 6:
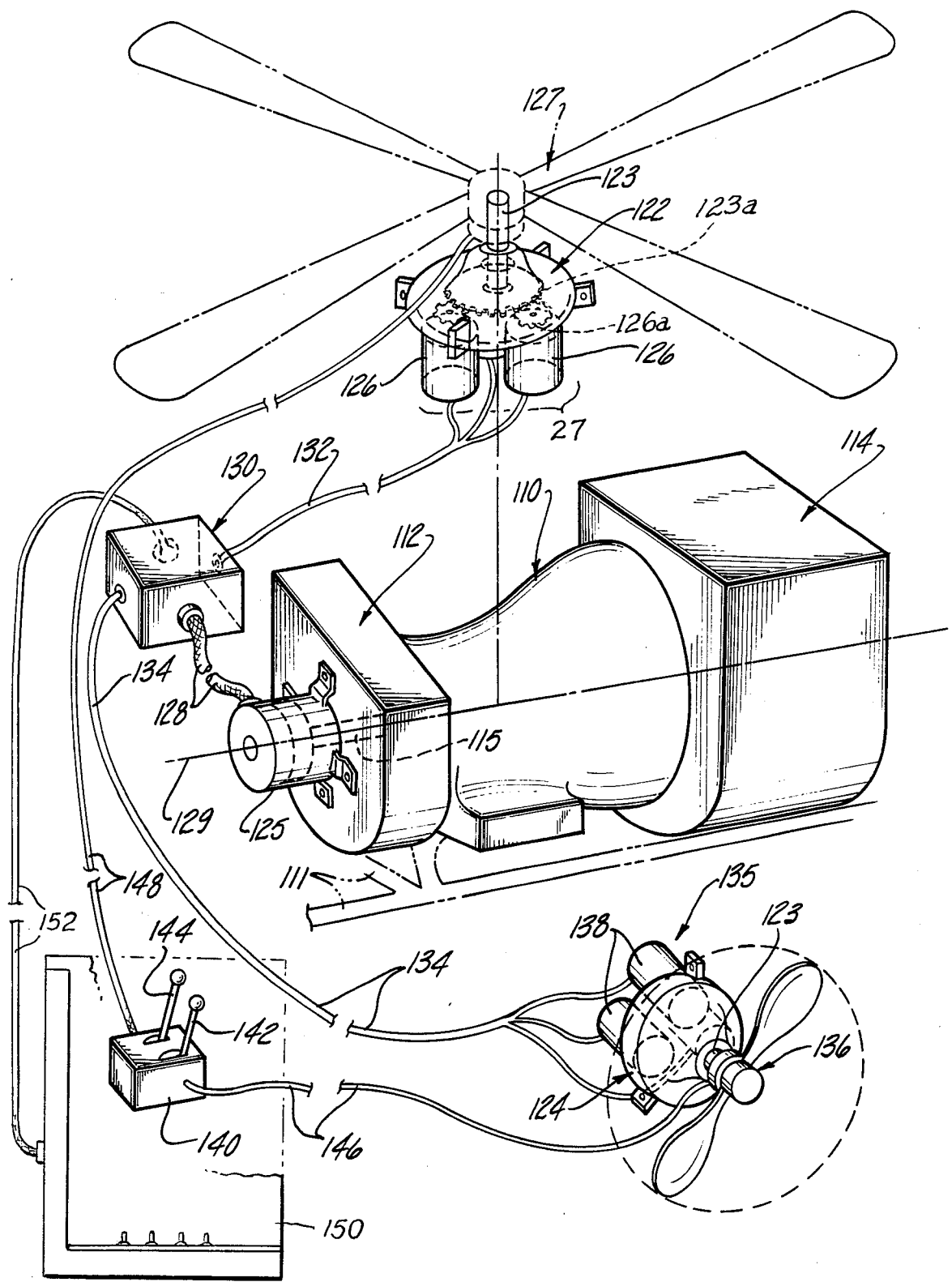
FIG. 6 is a perspective view of one contemplated modified embodiment of the present invention, the system being useful for helicopter adaptation.

The prior art system depicted in FIG. 1 shows one exemplary arrangement as may be used in an M-1 Tank propulsion system. This system comprises a heavy duty high powered gas turbine engine 10 having an air intake means 12 at one end, and at the other end having a large regenerator or heat exchanger 14. The engine's output shaft (not shown) delivers power in a known manner to the large heavy duty differential transmission 16 which operatively connects to the final drive assemblies 17 and 18 for the respective output sprocket-mounting shaft and housing 22 and 24. The existing mounting/suspension of these latter-mentioned engine 10, transmission 16, and drive assemblies 17 and 18, is achieved by a three point suspension system depicted schematically in FIG. 1 in the general areas respectively designated at 19, 20, and 21.

In the following described improved arrangement, the former vehicle-propelling drive means principally comprising the relatively large and heavy transmission 16 and final drive assemblies 17 and 18 of the prior art will be eliminated. These will be replaced by our novel electric drivetrain system comprised basically of generator means, preferably two sets of a multiplicity of electric drive motors, and related conductor and power controller means as depicted in FIGS. 2-5, and 7, now to be described.

DETAILED DESCRIPTION OF A PREFERRED EMBODIMENT

Referring first to the embodiment depicted in FIGS. 2-5 inclusive, the novel propulsion system hereof will be described. As in the prior art system of FIG. 1, this system also comprises the use of a same or similar gas turbine engine 10 suitably supported in a chassis 11 (FIG. 2), and having its air intake means 12 at one end, and at the other end preferably also having a large regenerator or heat exchanger 14. The engine's or regenerator's effective output shaft 15 delivers power to the operatively connected generator means 25, the location thereof being generally dictated by the nature of the vehicle and its engine's drive shaft. In the case of an M-1 military tank having an AGT 1500 engine, the drive shaft extends rearwardly, thus dictating the rearward location of said generator means 25.

It is comtemplated that for at least some embodiments, there may be gear reduction means (not shown) interposed between the turbine output shaft and the generator means.

The generator means 25 supplies the requisite electrical power to at least one set, and preferably two sets as shown in FIG. 2, of multiple drive motor means, as used to drive the output shaft 23 (FIGS. 2, 3, and 5) of the corresponding respective output shaft and housing subassemblies 22 and 24. Each set of said multiple drive motor means in the FIG. 2 embodiment, denoted 27 comprises a plurality of three or more, and more preferably five or six individual heavy duty, high speed electric drive motors 26, such motors perhaps being of a size approximately twelve inches in diameter and about six to ten inches long.

Generator means 25 is selected to develop the requisite power capacity necessary to supply the total number of motors. The generator means, which more preferably is of the alternator type, and preferably comprises a plurality of alternator 5, or generator windings, thereby collectively supply the power to said motors 26. This is done via a first multiwire conductor cable means 28 connected to a preferably solid state power controller means 30 (FIG. 2), and then via second and third multiwire or multiplex conductor cable means 32 and 34 (FIG. 2) respectively. More details of the power controller means 30 and of the conductor cable means 28, will follow hereinafter. These will include components like or corresponding to additional conductor cable means 36 which functionally interconnect the power controller means 30 with customary control means and data readout/instrumentation panel means normally installed in an operator's station 38 (FIG. 2). Station 38 corresponds essentially to its counterpart denoted 68 in FIG. 7.

FIGS. 3, 4 and 5 show exemplary modes of transmitting power from the individual electric motors or motor means 26 to the associated output drive shaft 23. In FIG. 3, shaft 23 carries at its inboard end a sun pinion gear 40, which is adapted to intermesh collectively with the individual smaller diameter pinion gears 42 respectively carried on the output shafts of the circumferentially disposed motor means 26.

In FIG. 4 arrangement, the output drive shaft 23' carries at its inboard end a somewhat larger diameter ring gear 44 having internal teeth which mesh with the aforesaid pinion gears, designated 42' therein and in FIG. 5.

Choosing appropriate sized gears 123a, 126a, 40, 42, 42' and 44, will assure at least a significant part of desired speed reduction of the drive motors. Additionally, it is contemplated that add-on or integrally built-in gear reducer units 46, shown better in FIG. 5, may also be used in conjunction with motors 26, to achieve the final desired range of reduced output speed for the pinion output gear 42'. One example may involve use of a 30,000 rpm high speed motor whose output may be reduced down either through the use of suitable relative gear size or additional speed/gear reducer units so that the hereinafter described drive sprocket 50 may be driven in a speed range of about 500 rpm's.

Continuing relative to FIG. 5, the ring gear 44 may be attached in any suitable manner to the inner or inboard end of the output drive shaft 23'. The outboard ends of these same respective shafts preferably have integrally formed therewith the sprocket-mounting bolt flange 48 at the opposite or outer end. Bolted to each flange is an appropriate drive sprocket 50, which sprocket may be provided with dual spaced sets of teeth to functionally engage an endless type drive track 52 shown in broken outline in FIG. 1.

Further relative to FIG. 5, the plurality of drive motors 26 are preferably functionally mounted by suitable bracket means 54 onto a mounting plate 56, preferably near the juncture of plate 56 with its annular flange 58. Motors 26, or their reducer units 46, have their respective output shafts project through both plate 56 and any desired journal bearings, and then have their output pinion gears 42' attached to the ends thereof, as illustrated in FIG. 5. Thus, a plurality of drive motors 26 may be assembled circumferentially on the mounting plate 56 to provide a suitable subassembly, which in turn may be adapted to be bolt-mounted in further assembly with the aforesaid output shaft and housing subassemblies 22', 24', via bolts 60.

In a situation wherein the turbine power plant is rated at approximately 1500 HP, then two sets of five of the electric drive motors for each output drive shaft would total ten motors to meet the required 1500 HP output. Thus, it is apparent that each motor would be selected to have a capacity to develop approximately 150 HP.

With regard to the application or use of this multi-motored drivetrain means on tracked tank type vehicles, such as depicted in FIGS. 1 and 2, the system embodies at least two output drive shafts such as designated 23, together with the corresponding respective shaft-driving gears, 40 or 44, and the drive sprockets 50. In this form of use, the output drive shafts are essentially axially aligned and their shaft driving gears are preferably of identical size as are drive sprockets 50.

With further regard to FIG. 2, the generator means 25 is of appropriate design capacity to generate sufficient electrical power to the two respective sets of multiple drive motors 26 shown operatively associated therewith. The generated electrical power is transmitted through the multiple conductor cable means 28 via power controller means 30, and hence via conductor cable means 32 and 34 to the respective sets of multiple drive motors 26, as will be described in more detail hereinafter.

Although in the FIG. 2 exemplified form there is shown a single housing for the generator means 25, as previously stated it is contemplated that said generator means 25 will comprise a suitable plurality of preferably alternator type generators 5. The plural alternators 5 will be appropriately mounted to be commonly driven by the turbine's effective output shaft 15. One such arrangement may be a generally tandem arrangement, although other arrangements are conceivable, including some generally radial dispositions relative to said shaft 15.

Further description of additional details regarding generation and control of the electrical power means will now be described. Proceeding to the illustrative electrical schematic depicted in FIG. 7, the illustrative electrical conductor cables 28, 32 and 34, the power controller means 30 and related components can be seen in a more understandable manner. The said generator means 25 is shown fragmentarily with the plurality of electrical conductor wires leading therefrom via said first conductor cable means 28, to where they enter the power controller device 30. Power controller means 30 has an outer housing which is shown schematically in broken outline 31. In a system using A.C. motor means, the conductor wires of cable means 28 lead to a suitable plurality of multi-phase controller means 62, shown herein schematically as boxes, but which preferably comprise known arrangements of solid state phase-reactive circuitry. Such circuitry preferably includes well known silicon controlled rectifier means (SCR) and the attendant electronic control circuitry. The latter preferably includes frequency inverter subcircuitry in conjunction therewith. The system thus generates the requisite frequency and voltage amplitude to operate A.C. type motors. The circuitry and related components are arranged so as to assure suitable A.C. multi-phase speed control of the motors 26. To effect motor reversal, the electrical rotation of the phase voltage is reversed in a well known manner.

Figure 7:
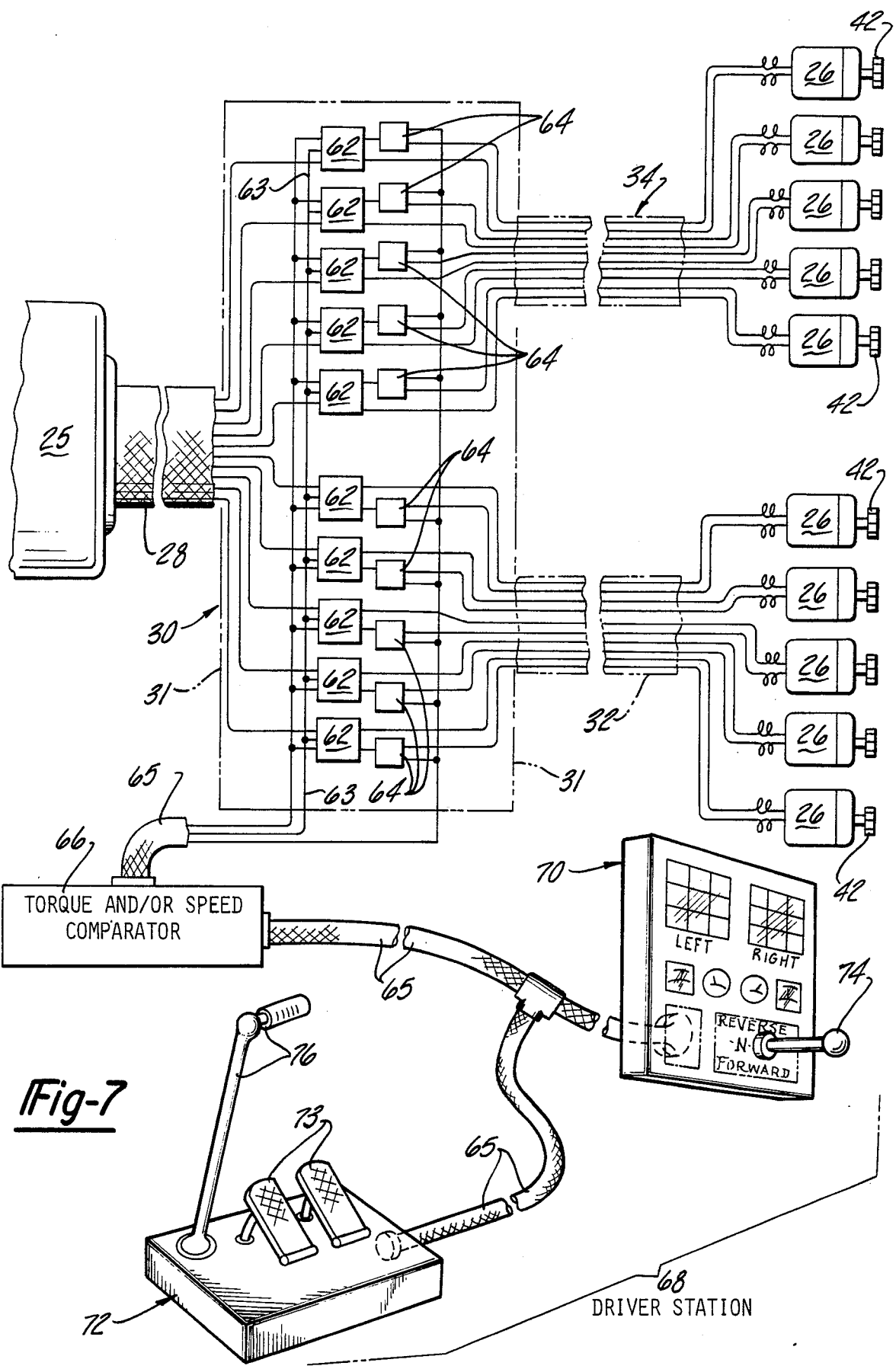
FIG. 7 is an electrical schematic representative of one arrangement to provide an A.C. electrical system herein.

The same FIG. 7 electrical schematic additionally shows a corresponding plurality of torque and speed sensor devices 64 functionally wired into the illustrative circuitry adjacent to the respective multi-phase controller means 62. The sensor devices 64 provide the appropriate electronic signals as feedback information to a comparator device 66, thereby providing in a known manner any potentially desired torque and speed comparator data.

It is further understood that the power delivered by the preferred solid state controller means to the multiple motors 26, will be controlled, at least in part, from a remote driver's station generally designated 68. The driver station 68 includes a data readout instrument panel means 70 and the equivalent of a variety of other conventional switch, lever, button, or touch-operated control means, as well as the equivalent of a standard mechanical accelerator pedal console means 72, with internal circuitry. Such pedal means 72 serves the function of varying certain electrical control circuits within the groups of the multi-phase power controller means 62. One of the multiplex conductor wires designated 63, shown within the phantom box outline 31, is part of the circuitry which is operatively connected with and leads from the pedal-and-hand console means 72, via the multiplex or multiwire conductor cable portions 65. Pedal control members 73, 73 serve to initiate predetermined functions of varying certain electrical control circuits disposed within the groups of the multi-phase power controller means 62. These same functions serve to control the average motor current allowed to flow between the power generator source 25 and the multiple motors 26, thereby varying the torque output of said motors. Functionally interconnected with said instrument and data readout panel means 70, is a typical manually operable reverse drive shift lever 74. It includes switching means (not shown) which are functionally wired into the circuitry via comparator device 66, so as to also control certain circuits contained within said multi-phase power controllers 62. It is contemplated that certain other controls, or some or all of the pedal-operated controls, conceivably can be established within the console means 72 so as to be operable at least partially by one or more multiple-function hand control lever means 76. The various solid state circuitry required are deemed to be already developed and well within known areas of electronic expertise. Thus, they are not per se considered to represent novel inventive facets hereof. It is further understood that the data from the comparator device 66 can be used in a known automatic manner to hold a reference speed or torque value, and/or to provide the same information to visual readout means.

It is understood that the instrument and data readout panel means 70 preferably contains most, if not all, of the usual turbine engine instrumentation including such things as left and right cluster instruments for readout of torque and speed, fuel meters, lubrication, oil, air pressure meters as well as odometer and many other instrument and control-effecting means.

For tracked vehicle applications, steering is to be accomplished by varying the collective speed of the drive motors 26. It is contemplated that during the steering function, one set of the drive motors may be utilized as an induction generator means in a known manner to feed power to the other set of drive motors. Related to this, the braking function may be such as to utilize control circuits that either reverse phases of the applied A.C. voltage or reverse motor polarities to take advantage of dynamic electrical braking. Alternatively, this may be achieved by utilizing suitable electrical braking grids in a known manner to thereby dissipate the generated energy of the motors when acting as generators.

The steer control function preferably is accomplished in combination with the accelerator function controls which collectively act to unbalance or vary the amount of power applied collectively to the multiple motors on opposite sides of the vehicle. Thus, it is apparent that the steering is accomplished in the general manner as previously stated hereinabove.

It is now apparent that the circuitry together with preferably solid state components will enable the sets of motors to be collectively energized and controlled to adjust their collective power and speed output in both forward and reverse directions.

Although in the representative schematic of FIG. 7 there are shown a like number of the multi-phase controllers 62 as there are motors 26, it is contemplated that the circuitry and component arrangement may be varied to have two or more motors run by a single one of the multi-phase controllers, among other contemplated potential arrangements.

It is further understood that where it may be desired to use D.C. type motors, then D.C. type controllers would be used in lieu of the multi-phase type controllers 62. That is, silicon controlled rectifier means could be used to generate the proportion of D.C. current necessary to drive the D.C. motors.

An additional contemplated arrangement includes a hybrid electrical system combining both A.C. and D.C. components. In this regard A.C. alternator means would be functionally connected in a circuit system so as to supply multi-phase A.C. power, which power would then be suitably rectified to convert it to D.C. power for applications where D.C. type motors are to be used.

From the foregoing description considered together with the illustrative drawing figures, it can be readily surmised that at least two reasonably viable electric drive powertrain systems have been evolved which provide many advantages over the existing systems in use. In summary of the FIGS. 2-5 embodiment(s), the major advantages of our novel electric drive system will be briefly reviewed. As initially discussed, the existing mounting arrangement (FIG. 1) of the turbine engine 10 and its drive assemblies 17 and 18 is achieved by a three point suspension system. The three points are depicted schematically in FIG. 1 in the general areas of 19, 20, and 21 respectively. With the use of this improved drivetrain system, it is apparent that the former exceptionally heavy transmission unit 16 is eliminated, as are the attendant undesirable highly stressful drive and reactive forces normally imposed on the existing three point suspension. Highly desirable additional benefits are reduced space and weight factors.

From the foregoing description thus far, it is apparent that the FIGS. 2-5 exemplary embodiments of the invention will achieve all the objectives and advantages set forth in the introductory portion of this application.

DETAILED DESCRIPTION OF MODIFIED EMBODIMENTS

Reference is now made to other preferred embodiments which can also effectively utilize the same or similar multiple motor drive powertrain concept or system described hereinabove.

Referring next to FIG. 6, the powertrain drive system described hereinabove, is depicted for illustrative use or application in other turbine driven vehicles such as in conjunction with a helicopter. In such usage, the two output drive shafts are disposed essentially at right angles and thus are not generally axially aligned as in the case of most wheeled or tracked vehicles.

A further applicational use would be for turbine driven ground effect vehicles. These would be more preferably of the larger cargo or troop carrying vintage embodying two or more output drive shafts which would more likely be disposed in spaced parallel form to drive a corresponding pair of lift-generating fans.

In the following description, many of the three digit reference numbers will have the same last two digits corresponding to the two digit numbers identifying many of the previously described components, but these three digit numbers will further comprise a prefix number one, representing a prefix of 100, placed before their other two digit numbers. In this manner, corresponding components in the respective embodiments may be better correlated to one another.

In the FIG. 6 embodiment, the helicopter's propulsion system comprises turbine engine 110, air intake means 112 at a forward end, and a regenerator or heat exchanger 114 at the other end all suitably secured in the fragmentary chassis 111. Similar to the FIG. 2 embodiment, the engine's effective output shaft 115 delivers power in a known manner to an operatively connected generator means 125 shown located toward the forward end of the engine 110. Generator means 125 supplies the requisite electrical power to a first drive motor means in the form of at least one set of multiple electrical drive motors means 27' comprising individual electrical drive motors 126 to effect driving rotation of the generally vertically disposed output rotor shaft 123. Shaft 123 is part of the combined output shaft and housing subassembly 122, which corresponds to the similar subassembly 22' or 24' in FIG. 5. A plurality of three drive motors 126 are shown in FIG. 6, but the number may vary according to the vehicle size and type. Operation is achieved in generally the same manner as previously described relative to driving the output shafts 23, 23' in FIGS. 3, 4 and 5, except that a known form of helicopter rotor blade subassembly, schematically designated 127, is functionally mounted on the rotor shaft 123. It is understood that output drive shaft 123 has a shaft-driving gear 123a attached at its inboard end to correspond to gear 40, or 44, and further that shaft 123 is disposed in a generally vertical manner relative to a fore-and-aft longitudinal orientation line 129. Line 129 is shown in broken lines in FIG. 6, and is merely indicative of the helicopter's general longitudinal chassis orientation; it does not necessarily have to be the axial center of the turbine engine.

In this same embodiment, the generator means 125 is selected to develop the requisite power capacity to effectively power the overall or collective drive motor means. An exemplary first drive motor means includes the plurality of three such high speed drive motors 126. The electrical power is supplied to said first such motor means via a first multiwire or multiplex type conductor cable means 128 emanating from generator means 125 and connected with appropriate power controller means 130. Controller means 130 may be similar in internal circuitry/component construction and function as its counterpart 30 described hereinabove for a previous embodiment. Exiting from controller means 130, there is a second multiwire conductor cable means 132 which leads toward and splits into individual conductor wire leads functionally connected to said respective drive motors 126. A third multiwire conductor cable means 134 similarly conducts power to a second electrical drive motor means designated broadly at 135 in the lower portion of FIG. 6.

This second electrical drive motor means 135 is designed to operatively drive a second output drive shaft 123° forming part of a normally rearwardly located combined output shaft and housing subassembly 124 adaptable for driving a stabilizing/steering tail rotor assembly 136 mounted on shaft 123'. The said shaft 123' is disposed generally horizontal and projects generally at right angles from the aforesaid longitudinal orientation line 129, or from a line generally parallel thereto. Said second electrical drive motor means 135 for certain size helicopters or ground effect vehicles, may comprise but a single heavy duty, high speed electrical drive motor similar to motors 126, while for other forms, depending upon the helicopter size and style, said drive motor means may also comprise a second set of a plurality of drive motors herein designated 138. One or more of the motors 138 are understood to be functionally arranged and oriented to effectively power the driveshaft 123' via an arrangement of pinion gears meshing with a similar sun or ring gear affixed to shaft 123'. This is achieved preferably in the same manner as described for the foregoing described embodiments.

Control of the respective rotor subassemblies 127 and 136 is to be accomplished through suitable conventional electrical and mechanical control means generally designated 140. The said control means 140 may further comprise joystick type control levers, 142, 144 which functionally connect via its internal components and related circuitry including conductor cable means 146 and 148 with the respective rotor subassemblies to effect their selective operation in a known manner. It is understood that control means 140 is preferably embodied within a suitable operator's control compartment or station 150. Station 150 is understood to also embody customary control panel and data readout instrumentation panel means corresponding generally to that described in conjunction with FIG. 7. Multiconductor cable means 152 functionally interconnects the power controller means 130 with the operator's station 150.

It is believed that the foregoing description adequately describes for one skilled in the art the requisite constructional and functional aspects of the contemplated helicopter and ground effect vehicle modes utilizing the disclosed multi-motor electric drive powertrain system. No further detail or operative description is deemed to be necessary.

The foregoing detailed description and accompanying illustrative drawings taken collectively are considered to be representative of a best mode and alternative modes of the invention which will viably achieve all of the objectives and advantages set forth throughout various portions of this application. In conclusion, it is apparent that the described vehicles and their novel subcombination modular powertrain means embody a unique concept of using multiple sets of plurality of relatively low torque electric motors, whose collective high speed input is converted to collective low speed but high torque output which is imparted to the vehicles' respective drive elements.

Although the contemplated embodiments utilizing the invention hereof have been described with certain particular details, it is apparent that still other changes and modifications may be made by those skilled in the art, without departing from the spirit and scope of the invention as defined in the annexed claims.

What is claimed is:

1. A turbine engine powered, self-propelled vehicle driven by a multiple electric motor powertrain, the powertrain having a low speed high torque output when compared to the speed and torque characteristics of the individual motors comprising: a vehicle chassis; a vehicle drive means adapted to support and move the vehicle chassis in the desired direction, said drive means having a power drive shaft connected at one end of the drive means and adapted to provide the power to move the drive means in the desired direction and having a sun gear on the other end of the power drive shaft; a gas turbine power source mounted in said vehicle chassis; an electrical power generating set consisting of a plurality of alternator units appropriately mounted to be commonly driven by the turbine's effective output shaft, said alternators producing an alternating current; a power controller means to control the alternator output; a plurality of electrical A.C. drive motors, said drive motors being electrically connected to and driven by the power controller, each motor having an output shaft driving a planet gear engaged with the sun gear of the power drive shaft, the motors being mounted with the planetary gears equispaced about the sun gear; a plurality of speed reducers interposed between the electric motors and the motors' output shafts; and a bracket means to functionally mount the plurality of electrical motors and their respective reducer units to a mounting plate so that their respective output shafts project through the mounting plate to provide a suitable subassembly which may be bolt-mounted in further assembly with the drive means power-drive shaft, permitting the planet gears to engage the sun gear of the power-drive shaft.

2. The vehicle of claim 1, where said vehicle propelling drive means further includes at least two output drive shafts, each output drive shaft having an associated shaft-driving sun gear and each shaft having its own set of multiple electrical drive motor means.

3. The vehicle of claim 1, where said shaft-driving sun gears of both of said vehicle propelling output drive shafts are of identical size and each has a pitch diameter significantly greater than the pitch diameter of said output drive planet; and said shaft-driving sun gears have complementary sized gear teeth and are arranged so that the plural drive planet gears functionally mesh with and impart self-propelling driving force to both of said vehicle's output drive shafts.

4. The vehicle of claim 1, where said drive means further include a toothed sprocket mounted on the end of the output drive shaft, said output shaft projecting through the vehicle hull and said toothed sprocket engaging and driving endless type driving tracks, on the outside of the vehicle hull.

* * * * *